United States Patent
Onitsuka et al.

(10) Patent No.: US 9,726,074 B2
(45) Date of Patent: Aug. 8, 2017

(54) TURBOCHARGER INTEGRATED VALVE UNIT

(71) Applicant: IHI Corporation, Koto-ku (JP)

(72) Inventors: Kazuhiro Onitsuka, Tokyo (JP); Takahiro Kobayashi, Tokyo (JP)

(73) Assignee: IHI Corporation, Koto-ku (JP)

( * ) Notice: Subject to any disclaimer, the term of this patent is extended or adjusted under 35 U.S.C. 154(b) by 459 days.

(21) Appl. No.: 14/313,051

(22) Filed: Jun. 24, 2014

(65) Prior Publication Data

US 2015/0010390 A1 Jan. 8, 2015

(30) Foreign Application Priority Data

Jul. 5, 2013 (JP) ................. 2013-141813

(51) Int. Cl.
| | |
|---|---|
| *F02B 37/18* | (2006.01) |
| *F01D 17/10* | (2006.01) |
| *F02D 41/02* | (2006.01) |
| *F02B 37/00* | (2006.01) |
| *F02D 41/00* | (2006.01) |

(52) U.S. Cl.
CPC .......... *F02B 37/183* (2013.01); *F01D 17/105* (2013.01); *F02B 37/002* (2013.01); *F02D 41/0007* (2013.01); *F02D 41/0255* (2013.01); *F05D 2220/40* (2013.01); *Y02T 10/144* (2013.01); *Y02T 10/26* (2013.01)

(58) Field of Classification Search
CPC ............. F02D 41/0007; F02D 41/0255; F02B 37/002; F02B 37/183; F01D 17/105; F05D 2220/40; Y02T 10/144; Y02T 10/26
See application file for complete search history.

(56) References Cited

U.S. PATENT DOCUMENTS

| | | | |
|---|---|---|---|
| 2007/0089413 A1* | 4/2007 | Green | ................. F01N 3/18 60/600 |
| 2012/0255297 A1* | 10/2012 | Boning | ............. F02B 37/183 60/602 |

FOREIGN PATENT DOCUMENTS

| | | | |
|---|---|---|---|
| JP | 60-131633 U | | 9/1985 |
| JP | 60131633 U | * | 9/1985 |
| JP | 5-92417 U | | 12/1993 |
| JP | 2002-195046 | | 7/2002 |
| JP | 2004-332686 | | 11/2004 |

* cited by examiner

*Primary Examiner* — Audrey K Bradley
(74) *Attorney, Agent, or Firm* — Oblon, McClelland, Maier & Neustadt, L.L.P.

(57) ABSTRACT

A turbocharger includes: an inflow passage to guide a fluid to a housing space for a turbine wheel; an exhaust passage to discharge the fluid having rotated the turbine wheel from a turbocharger body; a bypass passage connecting the inflow passage and the exhaust passage; a valve unit having one valve for a communicating portion between the exhaust passage and the housing space, and another valve for the bypass passage; an actuator to turn the valve unit and a stem connected to the valve unit about an axis of the stem; and a controller to operate the actuator. The controller adjusts the opening of the bypass passage by turning the valve unit within a specific range about the axis of the stem when a specific condition is met, and closes the exhaust passage by turning the valve unit beyond the specific range when the specific condition is not met.

3 Claims, 3 Drawing Sheets

TURBOCHARGER INTEGRATED VALVE UNIT

BACKGROUND OF THE INVENTION

Field of the Invention

The present invention relates to a turbocharger which includes a bypass passage constituting a bypass between an upstream and a downstream of a turbine wheel (turbine impeller).

Description of the Related Art

A turbocharger rotates a turbine wheel by using energy of an exhaust gas, and rotates a compressor wheel (compressor impeller) by the rotation of the turbine wheel through a shaft, thereby increasing a boost pressure of air which flows into an engine. The exhaust gas having rotated the turbine wheel is discharged to the outside from a discharge passage provided in a turbine housing. However, the boost pressure may be increased too high if the energy of the exhaust gas is excessive. To avoid this, there is a widespread configuration, such as a turbocharger described in Patent Document 1, which is provided with a bypass passage constituting a bypass between an upstream and a downstream of a turbine wheel, and with a waste gate valve located inside a discharge passage where an outlet end of the bypass passage is formed. When an actuator opens the waste gate valve, part of the exhaust gas flows into the downstream of the turbine wheel by bypassing the turbine wheel, and an increase in the boost pressure is thereby suppressed.

In the recent structure, due to the necessity to control a concentration of air pollutants in an exhaust gas, an exhaust emission control system is connected to a downstream side of a discharge passage of a turbocharger and removes the air pollutants. However, a catalyst in the exhaust emission control system for removing the air pollutants is not heated to an appropriate temperature at the start of an engine (at a cold start). Hence, the exhaust emission control system can hardly exert a sufficient emission control function. Accordingly, a turbocharger described in Japanese Utility Model Registration Application Publication No. Sho 60-131633 (Patent Document 1) includes a second bypass passage which connects a supply pipe for supplying an exhaust gas to the turbocharger and a discharge pipe for discharging the exhaust gas from the turbocharger. In addition, an integrated valve including two valve discs respectively provided on opposite sides is connected to a stem, and is turned about an axis of the stem by a second actuator provided separately from an actuator to operate a waste gate valve. The integrated valve is arranged in a positional relationship where, by turning the axis of the stem, the integrated valve can bring one of the valve discs into contact with a seat surface located at an outlet end of the discharge pipe or can bring the other valve disc into contact with the other seat surface located at an outlet end of the bypass passage. When the integrated valve blocks the discharge pipe at the cold start, the exhaust gas is guided to a catalyst by way of the second bypass passage. Thus, without consuming energy for rotating a turbine wheel, the high-temperature exhaust gas is directly guided to the catalyst, and hastens a rise in temperature of the catalyst.

SUMMARY OF THE INVENTION

In the turbocharger described in Patent Document 1, the second actuator to operate the integrated valve is installed in addition to the actuator to operate the waste gate valve. This structure requires an increased number of components, and causes an increase in the volumes of the turbocharger and devices around the turbocharger. In addition, the two actuators have to be controlled individually and such control is complicated.

Furthermore, the change in the structure of the supply pipe and the discharge pipe around the turbocharger needs to review the design including a layout of the engine and the turbocharger and the like, which makes replacement of the conventional structure difficult in some cases.

In view of the above, it is an object of the present invention to provide a turbocharger capable of achieving size reduction and simple control by reducing the number of components, and easily replacing a conventional structure.

An aspect of the present invention is a turbocharger, and its gist is as follows. The turbocharger includes: a turbocharger body; a shaft located inside the turbocharger body, and provided with a turbine wheel on one end and a compressor wheel on another end; a housing space provided inside the turbocharger body, and configured to house the turbine wheel; an inflow passage communicating with the housing space, and configured to guide a fluid flowing from outside of the turbocharger body to the housing space; an exhaust passage communicating with a downstream side of the housing space in a flowing direction of the fluid, and configured to discharge the fluid having rotated the turbine wheel from the turbocharger body; a bypass passage connecting the inflow passage and the exhaust passage; a valve unit formed by integrating a first valve and a second valve, the first valve configured to open and close a communicating portion between the exhaust passage and the housing space, the second valve configured to open and close the bypass passage; an actuator configured to turn the valve unit and a stem connected to the valve unit about an axis of the stem; and a controller configured to operate the actuator. The controller adjusts opening of the bypass passage by turning the valve unit within a specific range about the axis of the stem when a specific condition is met, and the controller closes the exhaust passage by turning the valve unit beyond the specific range when the specific condition is not met.

The turbocharger may further include: a first seat surface with which the first valve comes into contact when the first valve closes the exhaust passage; and a second seat surface with which the second valve comes into contact when the second valve closes the bypass passage. An angle between the first seat surface and the second seat surface may be below 180°.

The turbocharger may further include: a first seat surface with which the first valve comes into contact when the first valve closes the exhaust passage; and a second seat surface with which the second valve comes into contact when the second valve closes the bypass passage. An angle between the first seat surface and the second seat surface may be 90° or above, and the specific range may be a range where an angle between the first seat surface and a contact surface, which is to come into contact with the first surface, of the first valve of the valve unit is opened by 90° or above.

The turbocharger of the present invention can achieve size reduction and simple control by reducing the number of components, and easily replace a conventional structure.

DETAILED DESCRIPTION OF THE EMBODIMENTS

Figure 1:
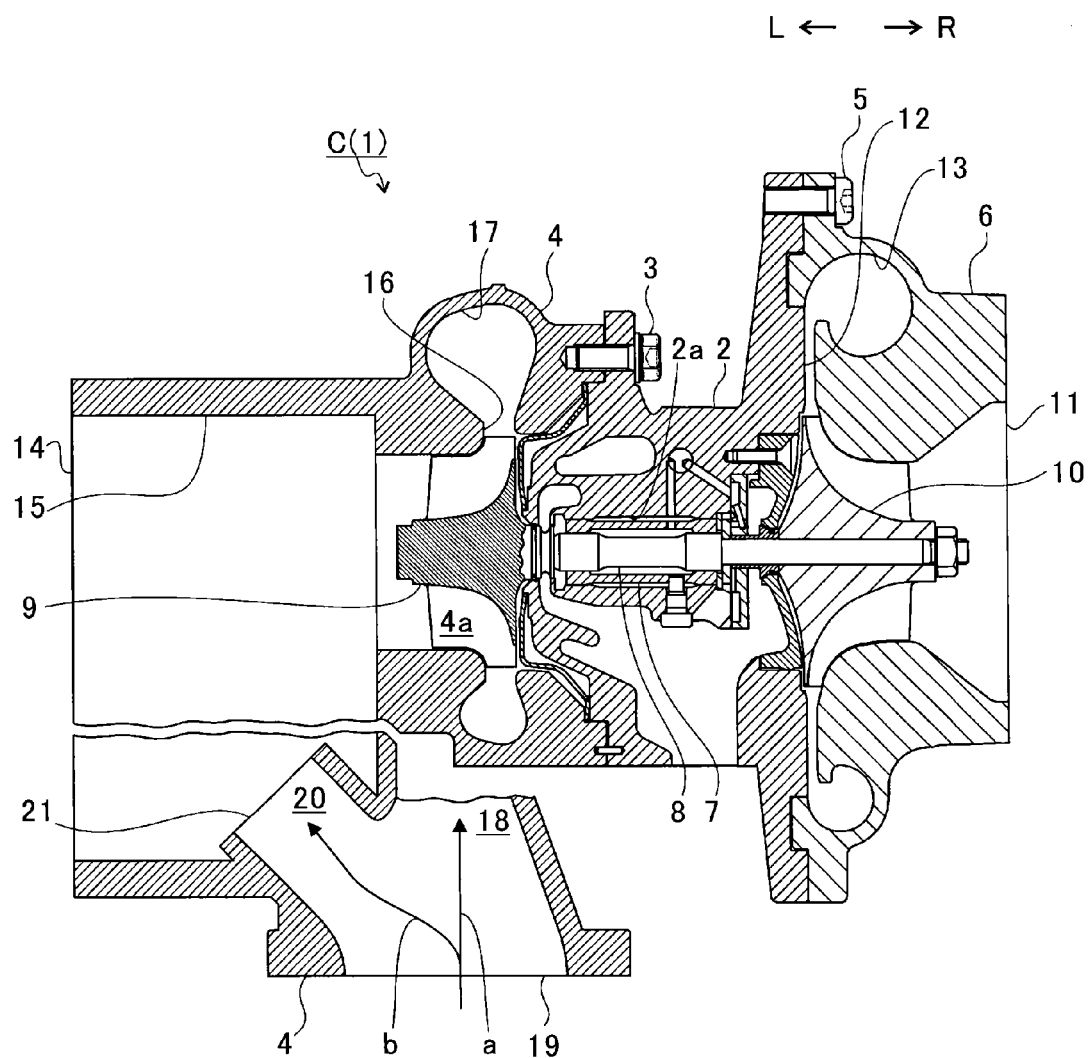
FIG. 1 is a schematic cross-sectional view of a turbocharger according to an embodiment of the present invention.

An embodiment of the present invention will be described below in detail with reference to the accompanying drawings. It is to be understood that dimensions, materials, specific numerical values and the like shown in the embodiment are mere examples for facilitating understanding of the present invention and are not intended to limit the invention unless otherwise noted. It is to be also noted that, in the specification and the drawings, constituents having substantially the same functions or configurations are denoted by the same reference numerals and overlapping descriptions are omitted, and that illustration of constituents that are not directly related to the present invention is omitted.

FIG. 1 is a schematic cross-sectional view of a turbocharger C. The following description will be given on the assumption that a direction indicated with an arrow L in FIG. 1 is a left side of the turbocharger C while a direction indicated with an arrow R therein is a right side of the turbocharger C. As shown in FIG. 1, the turbocharger C includes a turbocharger body 1. The turbocharger body 1 includes: a bearing housing 2; a turbine housing 4 fixed to an end surface on the left side of the bearing housing 2 with a fastening bolt 3; and a compressor housing 6 fixed to the right side of the bearing housing 2 with a fastening bolt 5.

The bearing housing 2 is provided with a bearing hole 2a that penetrates the bearing housing 2 in a right-left direction of the turbocharger C. A bearing 7 is provided in the bearing hole 2a. The bearing 7 rotatably supports a shaft 8. A turbine wheel 9 is integrally fixed to a left end portion (one end) of the shaft 8. The turbine wheel 9 is rotatably housed in a housing space 4a formed in the turbine housing 4. Meanwhile, a compressor wheel 10 is integrally fixed to a right end portion (the other end) of the shaft 8. The compressor wheel 10 is rotatably housed in the compressor housing 6.

An intake port 11 is formed in the compressor housing 6. The intake port 11 is opened to the right side of the turbocharger C and is connected to an air cleaner (not shown). In the state where the bearing housing 2 is connected to the compressor housing 6 with the fastening bolt 5, mutually opposed surfaces of the housings 2 and 6 form a diffuser passage 12 used for increasing a pressure of the air. The diffuser passage 12 is formed into an annular shape extending from inside to outside in a radial direction of the shaft 8 (the compressor wheel 10), and is connected to the intake port 11 in the inside in the radial direction via the compressor wheel 10.

In addition, the compressor housing 6 is provided with an annular compressor scroll passage 13. The compressor scroll passage 13 is located further outside in the radial direction of the shaft 8 than the diffuser passage 12. The compressor scroll passage 13 communicates with an intake port of an engine (not shown), and communicates with the diffuser passage 12 as well. Accordingly, when the compressor wheel 10 is rotated, the air is taken from the intake port 11 into the compressor housing 6, and the air thus taken in is increased in speed by an action of a centrifugal force in the course of passage through the vanes of the compressor wheel 10, then increased in pressure by the diffuser passage 12 and the compressor scroll passage 13, and guided to the intake port of the engine.

A discharge port 14 is formed in the turbine housing 4. The discharge port 14 is opened to the left side of the turbocharger C and is connected to an exhaust emission control system (not shown). In addition, the turbine housing 4 is provided with an exhaust passage 15. The exhaust passage 15 communicates with the discharge port 14 side of the housing space 4a of the turbine wheel 9. A passage 16 communicating with the housing space 4a is formed on the outside of the housing space 4a in the radial direction of the shaft 8. An annular turbine scroll passage 17 is provided further outside in the radial direction of the shaft 8 than the passage 16. The turbine scroll passage 17 communicates with the passage 16.

An inflow passage 18 is a passage formed inside the turbine housing 4. The inflow passage 18 communicates with the housing space 4a via the turbine scroll passage 17 and the passage 16. Illustration of a communicating portion between the inflow passage 18 and the turbine scroll passage 17 is omitted in this embodiment. A gas inflow port 19 is an inlet end of the inflow passage 18 to which an exhaust gas (a fluid) discharged from an exhaust manifold of the engine (not shown) is guided.

Accordingly, the exhaust gas flows from outside of the turbocharger body 1 into the inflow passage 18, and is further guided to the housing space 4a via the turbine scroll passage 17. The exhaust gas guided to the housing space 4a rotates the turbine wheel 9. The exhaust gas having rotated the turbine wheel 9 then passes through the exhaust passage 15 communicating with a downstream side of the housing space 4a in a flowing direction of the exhaust gas, and is discharged from the turbocharger body 1. Torque of the turbine wheel 9 is transmitted to the compressor wheel 10 through the shaft 8. By the torque of the compressor wheel 10 thus transmitted, the air is increased in pressure and is guided to the intake port of the engine as described previously.

The bypass passage 20 is a passage, which is provided inside the turbine housing 4 and branches off from the inflow passage 18. Here, of the turbine housing 4, a cross section (hereinafter referred to as a first cross section) of a portion where the inflow passage 18, the gas inflow port 19, and the bypass passage 20 are formed, and a cross section (hereinafter referred to as a second cross section) of a portion where the housing space 4a, the passage 16, and the turbine scroll passage 17 are formed, are illustrated on the same plane for facilitating understanding of the embodiment. In reality, however, the first cross section and the second cross section are sections located on mutually different planes.

In addition, the bypass passage 20 communicates with the exhaust passage 15. An outlet end 21 of the bypass passage 20 is located inside the exhaust passage 15. For example, the outlet end 21 of the bypass passage 20 may protrude into the exhaust passage 15 from a wall surface that forms the exhaust passage 15. In other words, the bypass passage 20 connects the inflow passage 18 and the exhaust passage 15.

As indicated with an arrow a, the exhaust gas flows from the gas inflow port 19 into the turbine housing 4. When the exhaust gas reaches the housing space 4a via the passage 18, the exhaust gas rotates the turbine wheel 9 and is then guided to the exhaust passage 15 as described previously. Meanwhile, when the exhaust gas is guided from the bypass passage 20 to the exhaust passage 15 as indicated with an arrow b, the exhaust gas is discharged from the turbine housing 4 without rotating the turbine wheel 9.

There are mainly two reasons for feeding the exhaust gas to the bypass passage 20. First, if the energy of the exhaust gas is excessive, the pressure of the air increased by the compressor wheel 10 (the boost pressure) may become too high. Accordingly, part of the exhaust gas is branched into the bypass passage 20. Thus, a flow amount of the exhaust gas contributing to the rotation of the turbine wheel 9 is reduced and the excessive increase in the boost pressure is thereby suppressed. The second reason is to promptly activate a function of the exhaust emission control system connected to the discharge port 14 described above. The exhaust emission control system removes air pollutants included in the exhaust gas by means of an oxidation reaction using a catalyst. However, the catalyst in the exhaust emission control system is not heated to an active temperature at a start of the engine (at a cold start). Hence, the exhaust emission control system can hardly exert a sufficient emission control function at that point. Accordingly, by feeding the exhaust gas to the bypass passage 20, the high-temperature exhaust gas is directly guided to the catalyst without consuming its energy for rotating the turbine wheel 9, and a rise in temperature of the catalyst can be hastened as a consequence.

Figure 2A:
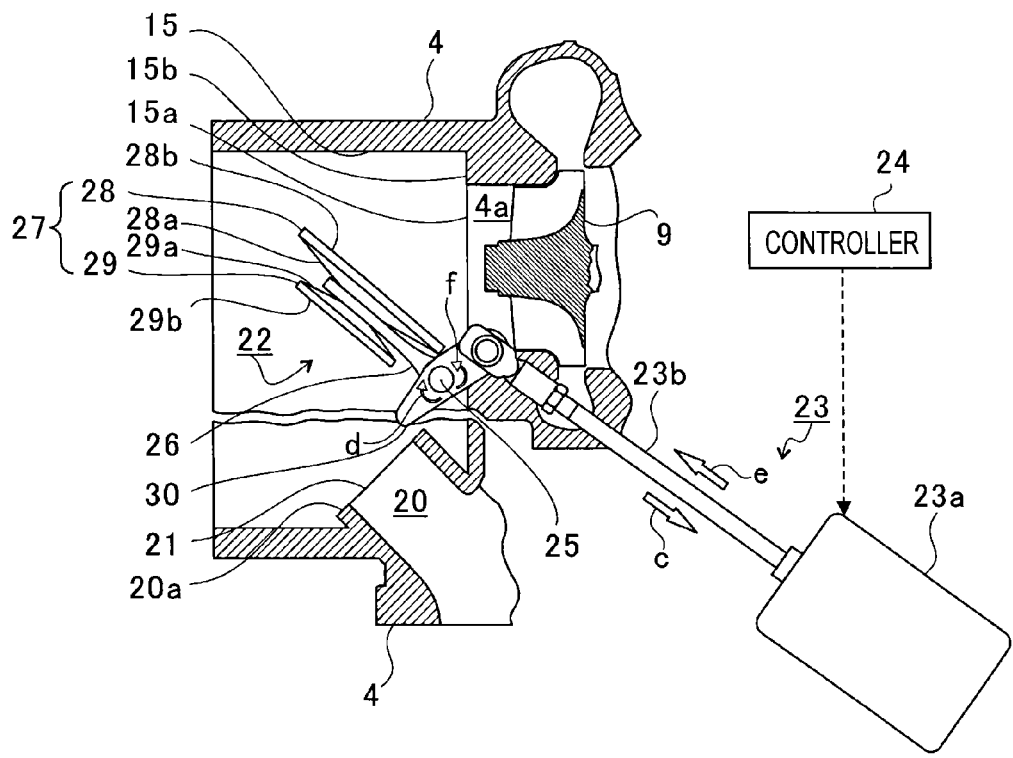
FIGS. 2A and 2B are explanatory views for explaining an opening and closing mechanism for opening and closing a bypass passage in the embodiment of the present invention.
Figure 2B:
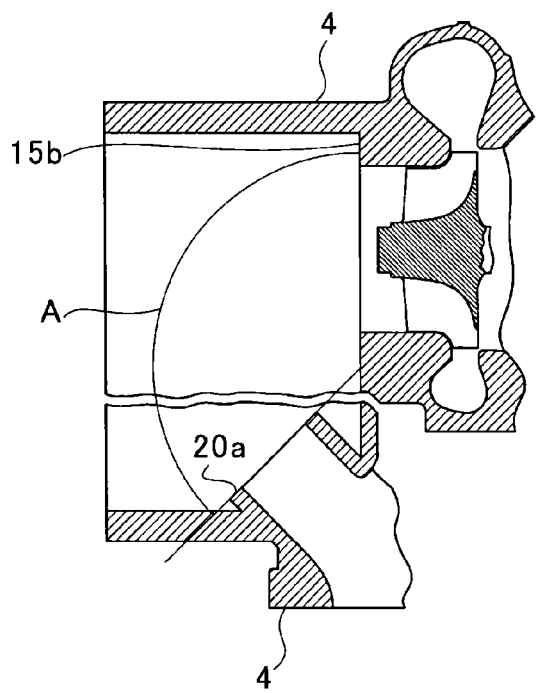

FIGS. 2A and 2B are explanatory views for explaining an opening and closing mechanism 22 for opening and closing the bypass passage 20. FIG. 2A depicts the turbine wheel 9 as well as a portion of the turbine housing 4 constituting a passage for the exhaust gas, which are extracted from FIG. 1, together with an actuator 23 and a controller 24. FIG. 2B illustrates the same constituents as FIG. 2A with the opening and closing mechanism 22, the actuator 23, and the controller 24 excluded from the illustration in FIG. 2A. In FIG. 2A, the opening and closing mechanism 22 and the actuator 23 are superposed on a cross section of the turbine housing 4 in order to facilitate understanding.

As shown in FIG. 2A, the opening and closing mechanism 22 includes a stem 25. The stem 25 is turnably supported by the turbine housing 4 through a bearing (not shown) in a state where the stem 25 penetrates a wall of the turbine housing 4. A valve unit 27 is connected to the stem 25 through an attachment plate 26. When the stem 25 is turned, the attachment plate 26 swings about the stem 25 and the valve unit 27 is tilted in conjunction with the swing of the attachment plate 26.

The valve unit 27 includes a first valve 28 and a second valve 29. A side of the first valve 28 facing the second valve 29 is provided with a tapered surface 28a whose diameter becomes gradually smaller toward the second valve 29. A side of the second valve 29 facing the first valve 28 is provided with a tapered surface 29a whose diameter becomes gradually smaller toward the first valve 28. The first valve 28 and the second valve 29 are attached to the attachment plate 26 in such a way that the tapered surfaces 28a and 29a are opposed to each other while sandwiching the attachment plate 26 in between. As described above, the valve unit 27 is formed by integration of the first valve 28 and the second valve 29.

The actuator 23 includes an electromotive unit 23a formed from a motor. A rod 23b is inserted into the electromotive unit 23a. The controller 24 is formed from, for example, an ECU (engine control unit) configured to control the engine. The controller 24 controls the electromotive unit 23a of the actuator 23.

The stem 25 is fixed to a link plate 30, which is turnably connected to the rod 23b of the actuator 23. Accordingly, when the rod 23b of the actuator 23 moves (travels) in a direction of an arrow c in accordance with a control signal from the controller 24, the stem 25 is turned clockwise (in a direction of an arrow d) in FIG. 2A through the link plate 30. Along with the turn of the stem 25, the valve unit 27 is turned clockwise in FIG. 2A about an axis of the stem 25. Meanwhile, when the rod 23b of the actuator 23 moves (travels) in a direction of an arrow e in accordance with a control signal from the controller 24, the stem 25 and the valve unit 27 are turned counterclockwise (in a direction of an arrow 1) in FIG. 2A about the axis of the stem 25.

The exhaust passage 15 spreads further outward in the radial direction of the shaft 8 than the housing space 4a. The exhaust passage 15 has a stepped surface 15b (a first seat surface), which is formed to extend from a connecting portion 15a between the exhaust passage 15 and the housing space 4a outward in the radial direction of the shaft 8. On the other hand, the first valve 28 includes a contact surface 28b formed on the opposite side of the tapered surface 28a. When the valve unit 27 is continuously turned in the direction of the arrow d along with the stem 25, the above-mentioned contact surface 28b comes into contact with the stepped surface 15b. In the state where the contact surface 28b is in contact with the stepped surface 15b, the contact surface 28b extends further outward in the radial direction of the shaft 8 than the connecting portion 15a around the entire circumference of the shaft 8. Thus, the connecting portion 15a is closed by the first valve 28.

Meanwhile, the outlet end 21 of the bypass passage 20 has an end surface 20a (a second seat surface) that forms an outer edge of the outlet end 21. The end surface 20a is formed into a flat surface. In the meantime, the second valve 29 includes a contact surface 29b formed on the opposite side of the tapered surface 29a. The contact surface 29b is formed large enough for blocking (covering) the entire outlet end 21. When the valve unit 27 is continuously turned in the direction of the arrow f along with the stem 25, the contact surface 29b comes into contact with the end surface 20a. Thus, the outlet end 21 is closed by the second valve 29.

As described above, the first valve 28 opens and closes the connecting portion 15a between the exhaust passage 15 and the housing space 4a, while the second valve 29 opens and closes the bypass passage 20.

As shown in FIG. 2B, an angle A is equal to or above 90° but below 180°. The angle A is an angle between the stepped surface 15b and the end surface 20a. As described previously, the first valve 28 comes into contact with the stepped surface 15b when the first valve 28 closes the exhaust passage 15. Meanwhile, the second valve 29 comes into contact with the end surface 20a when the second valve 29 closes the bypass passage 20.

For this reason, an angular range of the turn of the valve unit 27 is smaller than in the case where the angle A is equal to or above 180°. In other words, it is possible to use the actuator 23 designed for a smaller range of motion of the rod 23b. This makes it possible to reduce the size of the actuator 23 and to reduce the size of the turbocharger C.

FIGS. 3A to 3D are explanatory views for explaining how the valve unit 27 works to open and close the exhaust passage 15 and the bypass passage 20. Each of FIGS. 3A to 3D illustrates the same constituents as FIG. 2A with the actuator 23 and the controller 24 excluded from the illustration in FIG. 2A. The position of the valve unit 27 in the turning direction of the stem 25 about the axis of the stem 25 is different among FIGS. 3A to 3D.

Figure 3A:
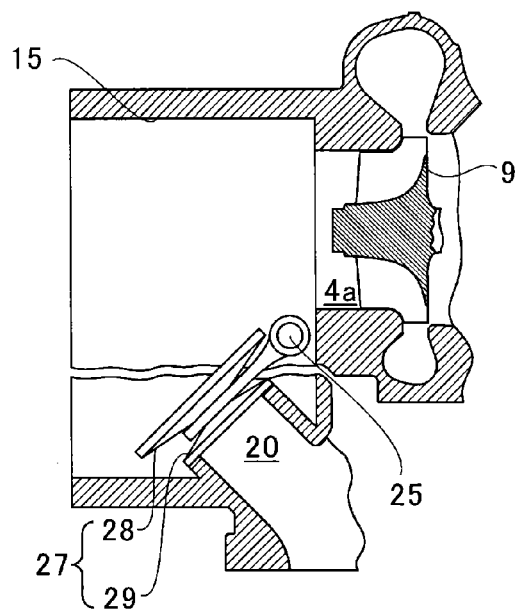
FIGS. 3A to 3D are explanatory views for explaining how a valve unit in the embodiment of the present invention works to open and close an exhaust passage and the bypass passage.

In the state shown in FIG. 3A, the valve unit 27 opens the exhaust passage 15 and completely closes the bypass passage 20. All the exhaust gas passes through the housing space 4a of the turbine housing 4 without flowing in the bypass passage 20. The exhaust gas contributes to the rotation of the turbine wheel 9 and is then discharged from the exhaust passage 15.

Figure 3B:
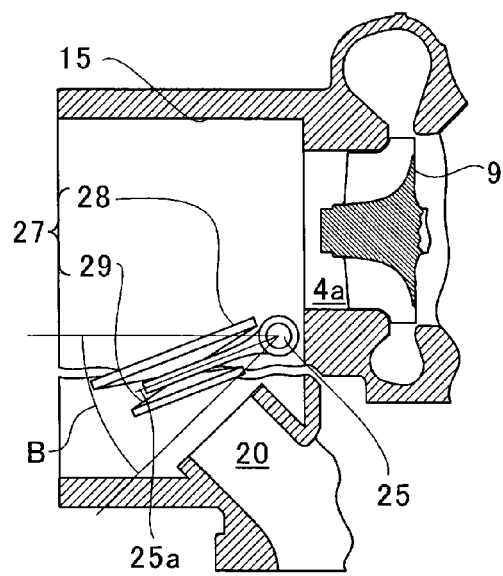

Meanwhile, in the state shown in FIG. 3B, the valve unit 27 opens both the exhaust passage 15 and the bypass passage 20. Part of the exhaust gas passes through the housing space 4a of the turbine housing 4 and contributes to the rotation of the turbine wheel 9. The rest of the exhaust gas is guided to the exhaust passage 15 through the bypass passage 20 without contributing to the rotation of the turbine wheel 9.

Figure 3C:
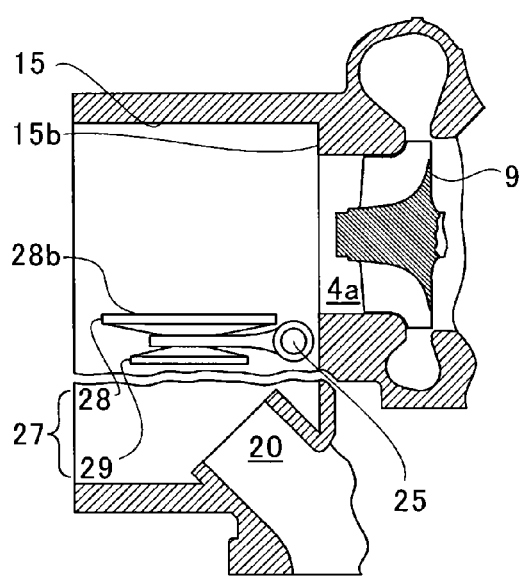

Meanwhile, in the state shown in FIG. 3C, the contact surface 28b of the first valve 28 of the valve unit 27 is opened almost at a right angle to the stepped surface 15b. In this case, the valve unit 27 opens both the exhaust passage 15 and the bypass passage 20 like in the case in FIG. 3B. Further, the opening of the bypass passage 20 is larger than that in FIG. 3B. Accordingly, the flow of the exhaust gas discharged from the bypass passage 20 is less likely to be blocked by the valve unit 27. For this reason, the flow amount of the exhaust gas flowing in the bypass passage 20 is larger than in the case in FIG. 3B whereas the flow amount of the exhaust gas flowing in the housing space 4a is smaller than in the case in FIG. 3B.

As shown in FIGS. 3A to 3C, the opening of the bypass passage 20 is made variable by the valve unit 27. Thus, the flow amount of the exhaust gas flowing in the housing space 4a is properly adjusted.

If the valve unit 27 is turned further clockwise in FIG. 3C beyond the position of the valve unit 27 shown in FIG. 3C, the valve unit 27 may block the flow of the exhaust gas guided from the housing space 4a to the exhaust passage 15. For this reason, the controller 24 restricts the range of the motion of the valve unit 27 to a specific range.

The specific range is a range of the clockwise turn in FIGS. 3A to 3C from the position illustrated in FIG. 3A where the bypass passage 20 is fully opened to the position illustrated in FIG. 3C where the contact surface 28b of the first valve 28 is opened almost at a right angle to the stepped surface 15b. In other words, the specific range is a range where an angle between the contact surface 28b and the stepped surface 15b is opened by 90° or above. FIG. 3B shows a range B of a turn of a center line 25a which is the center of the attachment plate 26 in a circumferential direction of the stem 25, which is turned about the axis of the stem 25 when the valve unit 27 moves within the specific range.

As shown in FIG. 3B, the angle between the contact surface 28b of the first valve 28 and the stepped surface 15b is opened by 90° or above, no matter which position in the specific range the valve unit 27 is located in. For this reason, the valve unit 27 does not block the flow of the exhaust gas guided from the housing space 4a to the exhaust passage 15. Thus, it is possible to avoid a decrease in efficiency of the turbocharger C.

Meanwhile, as shown in FIGS. 3A to 3C, it is desirable that the timing of adjusting the opening of the bypass passage 20 by moving the vale unit 27 within the specific range come after a sufficient period of time passes since the start of the engine and the temperature of catalyst of the exhaust emission control system is raised to the active temperature or higher. To this end, the controller 24 turns the valve unit 27 within the specific range about the axis of the stem 25 and thereby adjusts the opening of the bypass passage 20 when specific conditions are met. Such specific conditions include a condition that time elapsed since the start of the engine exceeds a predetermined time period, a condition that the temperature of the catalyst in the exhaust emission control system reaches the active temperature or above, and so forth. However, the specific conditions are not limited to the conditions cited above and may include other conditions.

Figure 3D:
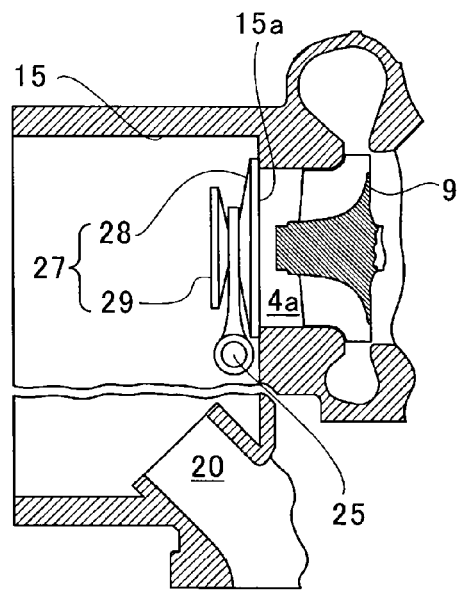

On the other hand, in the state where the above-mentioned specific conditions are not met, i.e., at a cold start, the controller 24 turns the valve unit 27 beyond the specific range and closes the connecting portion 15a between the housing space 4a and the exhaust passage 15 as shown in FIG. 3D. As a consequence, all the exhaust gas passes through the bypass passage 20 and flows into the exhaust passage 15, whereby the temperature of catalyst in the emission control system is increased promptly.

As described above, the valve unit 27 is formed by the integration of the first valve 28 and the second valve 29. The first valve 28 opens and closes the connecting portion 15a between the exhaust passage 15 and the housing space 4a for housing the turbine wheel 9. The second valve 29 opens and closes the bypass passage 20. Accordingly, it is possible to open and close the connecting portion 15a and to adjust the opening of the bypass passage 20 by use of the single actuator 23. In other words, it is not necessary to provide two actuators individually. Thus, it is possible to reduce the number of components and to reduce the size of the turbocharger C. In the meantime, the controller 24 only needs to control the single actuator 23 instead of controlling two actuators. Thus, the control can be simplified. In addition, components such as pipes to be connected to the turbocharger C may employ conventional structures. Accordingly, the turbocharger C of the embodiment can easily replace a conventional turbocharger only by mounting the turbocharger C and changing settings of the ECU.

Although the preferred embodiment of the present invention has been described above with reference to the accompanying drawings, it goes without saying that the present invention is not limited only to the above-described embodiment. It is obvious to those skilled in the art that various changes and modifications can be conceived of within the scope defined in the appended claims. It is understood that such changes and modifications are naturally encompassed by the technical scope of the present invention as well.

INDUSTRIAL APPLICABILITY

The present invention is applicable to a turbocharger which includes a bypass passage constituting a bypass between an upstream and a downstream of a turbine wheel.

What is claimed is:
1. A turbocharger comprising:
a turbine wheel;
a turbine housing including the turbine wheel in a housing space and provided with an exhaust passage;
an inflow passage formed inside the turbine housing, coupled to an exhaust manifold of an engine, and communicating with the housing space;
a bypass passage provided inside the turbine housing, branching off from the inflow passage, and communicating with the exhaust passage;
a valve unit including first and second valves attached to an attachment plate,
the first valve including:
a first contact surface being capable of contacting a first seat surface provided with the exhaust passage, and
a first tapered surface facing the second valve, the first tapered surface having a diameter being gradually smaller toward the second valve, and the second valve including:
- a second contact surface being capable of contacting a second seat surface provided with the bypass passage, and
- a second tapered surface facing the first valve, the second tapered surface having a diameter being gradually smaller toward the first valve;

an actuator coupled to the valve unit; and a controller coupled to the actuator.

2. The turbocharger according to claim 1, wherein the first and second valves are attached in such a way that the first and second tapered surfaces are opposed to each other.

3. The turbocharger according to claim 2, wherein the first and second valves sandwich the attachment plate.

* * * * *